（12）United States Patent
Fischer et al.

(10) Patent No.: US 7,592,919 B2
(45) Date of Patent: Sep. 22, 2009

(54) CIRCUIT ARRANGEMENT FOR USE IN RF TRANSPONDERS AND METHOD FOR CONTROLLING A NUMBER OF SUCH TRANSPONDERS

(75) Inventors: Martin Fischer, Pfedelbach (DE);
Ulrich Friedrich, Ellhofen (DE)

(73) Assignee: ATMEL Germany GmbH, Heilbronn (DE)

( * ) Notice: Subject to any disclaimer, the term of this patent is extended or adjusted under 35 U.S.C. 154(b) by 0 days.

(21) Appl. No.: 11/968,637

(22) Filed: Jan. 2, 2008

(65) Prior Publication Data

US 2008/0180219 A1    Jul. 31, 2008

Related U.S. Application Data

(63) Continuation of application No. PCT/EP2006/006159, filed on Jun. 27, 2006.

(30) Foreign Application Priority Data

Jul. 2, 2005    (DE) ........................ 10 2005 031 021

(51) Int. Cl.
*G08B 13/14* (2006.01)
(52) U.S. Cl. .................................. 340/572.1
(58) Field of Classification Search .............. 340/572.1, 340/10.1, 664, 660, 644, 661; 365/189.011
See application file for complete search history.

(56) References Cited

U.S. PATENT DOCUMENTS

| 5,208,773 | A | 5/1993 | Okitaka et al. | |
| 5,963,144 | A | 10/1999 | Kruest | |
| 6,404,325 | B1 * | 6/2002 | Heinrich et al. | 340/10.34 |
| 6,812,841 | B2 * | 11/2004 | Heinrich et al. | 340/572.1 |
| 6,982,627 | B2 | 1/2006 | Oberhuber et al. | |
| 7,109,845 | B2 | 9/2006 | Fischer | |

(Continued)

FOREIGN PATENT DOCUMENTS

DE    41 08 996 A1    9/1991

(Continued)

OTHER PUBLICATIONS

Goser, Karl: "Grossintegrationstechnik Teil 1: Vom Transistor zur Grundschaltung.", Heidelberg: Hüthig Buch Verlag GmbH, 1990, pp. 274-281.

(Continued)

*Primary Examiner*—Phung Nguyen
(74) *Attorney, Agent, or Firm*—Muncy, Geissler, Olds & Lowe, PLLC

(57) ABSTRACT

A storage circuit arrangement for a semi-passive or passive RFID transponder is provided. In prior-art circuit arrangements, storage capacitors are routinely discharged in an undefined fashion via leakage currents for a control mode of the transponder, so that the persistence times depend greatly on the ambient temperature and on existing manufacturing tolerances. It is proposed according to an embodiment to charge a first electrical storage device with a first reference voltage and then to discharge it again in a defined fashion during a time t via discharge device. Advantageously, in addition a storage mode of the first storage device to hold the control mode can be transmitted in a controlled fashion via a switching device to a second storage device with C2<<C1 to shorten a settle time and to accelerate the anticollision.

13 Claims, 2 Drawing Sheets

U.S. PATENT DOCUMENTS

| | | | |
|---|---|---|---|
| 7,215,251 B2 * | 5/2007 | Hyde | 340/661 |
| 7,377,445 B1 * | 5/2008 | Stewart et al. | 235/487 |
| 2005/0179520 A1 | 8/2005 | Ziebertz | |
| 2005/0237844 A1 * | 10/2005 | Hyde | 365/228 |

FOREIGN PATENT DOCUMENTS

| | | |
|---|---|---|
| DE | 102 29 459 C1 | 11/2003 |
| DE | 103 06 689 A1 | 8/2004 |
| DE | 10 2004 007 106 A1 | 9/2005 |
| WO | WO 03//063076 A1 | 7/2003 |

OTHER PUBLICATIONS

Goser Karl: "Large Scale Integration"—translation of the above document.

* cited by examiner

CIRCUIT ARRANGEMENT FOR USE IN RF TRANSPONDERS AND METHOD FOR CONTROLLING A NUMBER OF SUCH TRANSPONDERS

This nonprovisional application is a continuation of International Application No. PCT/EP2006/006159, which was filed on Jun. 27, 2006, and which claims priority to German Patent Application No. DE 102005031021, which was filed in Germany on Jul. 2, 2005, and which are both herein incorporated by reference.

BACKGROUND OF THE INVENTION

1. Field of the Invention

The present invention relates to a storage circuit arrangement for a semi-passive or passive RFID transponder, having at least one first storage device for storing electrical energy, which is formed to hold a control mode of the transponder for a predefined time t. The invention also relates to a method for holding a control mode of a semi-passive or passive RFID transponder.

2. Description of the Background Art

A radio frequency identification system (RFID system) is generally formed of two basic components, the usually passive transponder, also called a tag or label which is attached to the objects to be identified and in this form does not have its own power supply, and a stationary or mobile acquisition device (base station, reader). As the core of this type of system, the transponder comprises an integrated circuit (IC) as a data carrier and a receiving device in the form of an antenna; the acquisition devices comprise a control unit, frequency module, and (transmit) antennas. The data exchange between the transponder and base station occurs via electromagnetic fields in different frequency ranges, preferably, however, as mentioned, in the RF range.

Transponders of this type may also possess sensor properties, e.g., for measuring temperatures, and are then called remote sensors, which also fall within in the scope of the present invention.

If several transponders located in a common RF field are to be read with the use of a passive RFID system, an anticollision procedure is used. The transponders are read in series with the use of a procedure of this type. After a specific data set from the integrated circuit of the transponder is read, for example, an identification number (ID), the read transponder is placed in an inactive mode (operating or control mode), i.e., switched to mute with the setting of a corresponding label (flag) for communication with the base station, so that other transponders can then be read as interference-free as possible.

Because passive transponders are supplied with power via the RF field, there is a particular problem in such applications in making sure that during the entire procedure the transponders also maintain their control modes over supply gaps or no longer participate in the communication with the base station at least after a successful reading of the data set. This aspect is critical primarily when the carrier frequencies move within the UHF or microwave range and the position of the transponder in space relative to the base station changes:

In the UHF and microwave range because of superposition effects due to reflections, spatial areas arise in which the power supply to the transponder is no longer assured by the carrier signal. Such spatial areas must then be bridged by power storage device on the transponder IC, usually a capacitor. Because the times associated with bridging of such spatial areas can become rather greater and are routinely in the range of seconds, such storage devices require extensive areas in the IC, so that suitable solutions are structurally uneconomical. For this reason, efforts have been made in the past to assure that such supply gaps do not have a negative effect on the anticollision procedure.

U.S. Pat. No. 5,963,144 discloses a transponder and a method for its control in which the transponder after its recognition (registration) is completely turned off for a time t, whereby t is approximately 2 s. Regardless of whether the anticollision procedure has been completed, the corresponding transponder after the elapse of this time automatically again engages in the communication. The shutting off of the transponder according to U.S. Pat. No. 5,963,144 occurs by a shifting of the transponder's input impedance, so that it can be regarded in particular as disadvantageous that during the time in question said transponder cannot be otherwise activated, e.g., by means of a set or reset procedure. Moreover, during supply gaps undefined control modes of the transponder may occur, which after the elapse of time t are possibly transmitted to the entire system. Saving of the control mode (the register) is not possible.

WO 03/063076, which corresponds to U.S. Pat. No. 6,812,841, describes a control method for a transponder during which a node is definitely set. The (voltage) state at this node is then maintained by means of a storage capacitor as long as the tag is supplied with power. If the (internal) supply is lost, leakage currents of the disclosed circuit result and discharge the node, i.e., the capacitor. This embodiment results in the following disadvantages: Because the discharge of the storage capacitor occurs in an uncontrolled fashion via leakage currents $I_L$ (also called "undefined discharge" hereinbelow), the achievable persistence times depend greatly on the ambient temperature T ($I_L \sim e^{-T}$). As a result, the possible storage time can vary by more than a factor of 10. In addition, leakage currents generally also have a great manufacturing-related tolerance at a constant temperature. It is therefore not possible in particular with the solution proposed here to meet the values for the persistence time t (500 ms<t<5 s), as required by the standard ISO-IEC_CD 18000-6C relevant here (page 31). In addition, in the case of the subject matter of WO 03/063076 resetting of the node is not possible once it has been set. Contrary to the requirements of the aforementioned standard, no persistence time at all is defined furthermore for an existing power supply for the tag; i.e., discharging of the node does not occur.

According to German Patent Application 10 2004 007 106.3, which corresponds to U.S. Publication No.: 2005/0179520, and which is incorporated herein by reference, a storage capacitor is also discharged in an undefined fashion for a control mode of a transponder or a remote sensor via leakage currents, so that persistence times depend on the ambient temperature and existing manufacturing tolerances.

SUMMARY OF THE INVENTION

It is therefore an object of the present invention to provide a circuit arrangement and a method of the aforementioned type to overcome as much as possible the disadvantages of the prior art in a simple and cost-effective manner.

The object is achieved in a storage circuit arrangement of the aforementioned type by a discharge device by which the first storage device may be discharged within time t in a defined fashion. The circuit arrangement of the invention consequently is based not on the presence of undefined leakage currents but on the fact that a relatively large first storage device, which was previously charged in a specific manner, can be discharged in a defined fashion starting at a certain time by means of a very small current flow. Care must be taken that the defined discharge current flow at a particular circuit node is greater than the leakage currents arising there. According to the invention, a holding time t, virtually definable in any manner by suitable dimensioning of both the storage and the discharge device, can be achieved thereby.

Accordingly, to achieve the object, it is provided in a method of the aforementioned type that a first electrical storage device holds the control mode is charged with a first reference voltage and then discharged again in a defined fashion during a time t.

According to an embodiment of the circuit arrangement according to the invention, the arrangement has a second storage device for storing electrical energy, which is functionally connected to the first storage device to assume a storage mode of the first storage device via a controllable switching device. In another method of the invention, it can be provided accordingly that a storage mode of the first storage device to hold the control mode is transmitted in a controlled fashion to a second storage device. In this way, the discharge process due to the provision of two jointly acting storage devices can also occur when a sufficient supply voltage for the transponder is present during the entire time, as required in ISO-IEC_CD 18000-6C. The defined discharge current necessary for this purpose can be derived, for example, from a bandgap, which, e.g., makes available a suitable current reference. The desired discharge current can be generated with this current reference and a suitable current mirror.

According to an embodiment of the storage circuit arrangement according to the invention, the first and/or second storage device are made as capacitors (capacitors $C_1$, $C_2$); in this case, the first storage device preferably can take up more electrical energy than the second storage device, i.e., $C_1 \gg C_2$. In this fashion, according to the method, the storage mode of the first storage device can be transmitted to the second storage device even at a time before the first storage device was at all charged, without a voltage dip occurring thereby. Within the scope of the present invention, this eliminates the settle time of one to several milliseconds, as a result of which the anticollision procedure becomes more rapid. "Settle time" is understood to be the time for waiting according to the employed protocol until the employed storage device (capacitors) have charged. If in addition the transmission or temporary storage in the second storage device occurs even before the beginning of the charging phase of the first storage device, the first storage device can be recharged, independent of the mode of the second storage device, immediately after an area of sufficient field strength is reached.

Furthermore, a second controllable switching device, which charges the first storage device is connected between the first reference voltage and the first storage device with a first reference voltage, can be provided in a storage circuit arrangement of the invention. In terms of process technology, the charging of the first storage device occurs preferably at times of available power supply of the transponder, whereby the first storage device according to another development of the method of the invention is recharged at least whenever the transponder is again supplied with power after a power supply gap.

Moreover, the first and/or second storage device can be discharged via a third controllable switching device, for example, in the case of a reset signal, to be able to reset the status register, created by the present invention, immediately back to zero.

The storage circuit arrangement of the invention according to a preferred development has a logic circuit, which in a functional signaling connection to the discharge device and/or the first switching device and/or the second switching device and/or the third switching device is arranged to control at least one of these means.

To determine or to evaluate the control mode of a transponder or a comparable device, the storage circuit arrangement of the invention preferably has an evaluation circuit for a storage mode of the first and/or the second storage device, which are functionally connected here to the first or second storage device and in an advantageous fashion alternatively or in addition to a second reference voltage. It can therefore be provided in terms of process technology that the storage mode of the first and/or second storage device is compared with a second reference voltage to evaluate the control mode.

The evaluation circuit can alternatively be formed as a comparator (with a suitable additional reference voltage) or as an inverter. In this regard, when a comparator is used, the evaluation threshold for the storage level (HIGH=set, i.e., tag detected (selected); LOW=not set) of the second storage device can be established virtually freely via the reference voltage, whereas in the case of an inverter, e.g., a CMOS inverter, this is possible only in a certain range, which depends moreover on the supply voltage.

In terms of process technology, accordingly the transmitted control mode of the first and/or second storage device is preferably evaluated for control purposes, so that if there are two storage devices, the first storage device would also be designated as preload means and the second storage device as the actual mode holding means.

In addition, the evaluation circuit and the logic circuit unit preferably have a functional signaling connection, so that a control feedback to the logic switching unit is possible via the result of the evaluation, e.g., in the case of a stored logic zero, to suppress at the second storage device the transmission of a storage mode, optionally different from zero, of the first storage device by blocking the first switching device located in-between. This means that the controlled transmission of the storage mode according to the invention occurs as a function of the evaluation result.

The second reference voltage according to another embodiment of the invention is smaller, particularly by a multiple, than the first reference voltage, $UREF1 \gg UREF2$. Together with relative dimensioning of the storage device ($C_1 \gg C_2$) as discussed above, this has the effect that the persistence time t becomes longer, whereby the transmission of the storage mode from the first to the second storage device—as mentioned—moreover can occur as early as possible during the loading cycle of the first storage device.

Special developments of the storage circuit arrangement of the invention provide that at least one of the first, second, or third switching device is made as a PMOS transistor, as a NMOS transistor, or as a switching unit having at least one transistor, particularly as a disconnectable voltage follower. In addition, at least one of the first, second, or third switching device can be formed as a series connection of a plurality of transistors, particularly PMOS and/or NMOS transistors. According to the invention, therefore, the switching device need not be only "simple" switching device, such as isolated transistors. It is therefore possible in this regard also to use micromechanical switches in which advantageously hardly any or no leakage currents occur. Accordingly, an embodiment of the circuit arrangement of the invention provides that at least one of the first, second, or third switching device is made as a micromechanical switch with low or vanishing leakage currents.

For the purpose of a flexible usability of the circuit arrangement of the invention, moreover, the first and/or second storage device can be influenced, especially discharged, by an external control signal, such as a reset signal or the like.

The thus made storage circuit arrangement or the proposed method is notable in all embodiments of the invention particularly in that 500 ms<t<5 s, so that the requirements of the aforementioned ISO standard are met, whereby preferably in addition after the elapse of time t, the second storage device is automatically discharged also when a supply voltage is present.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
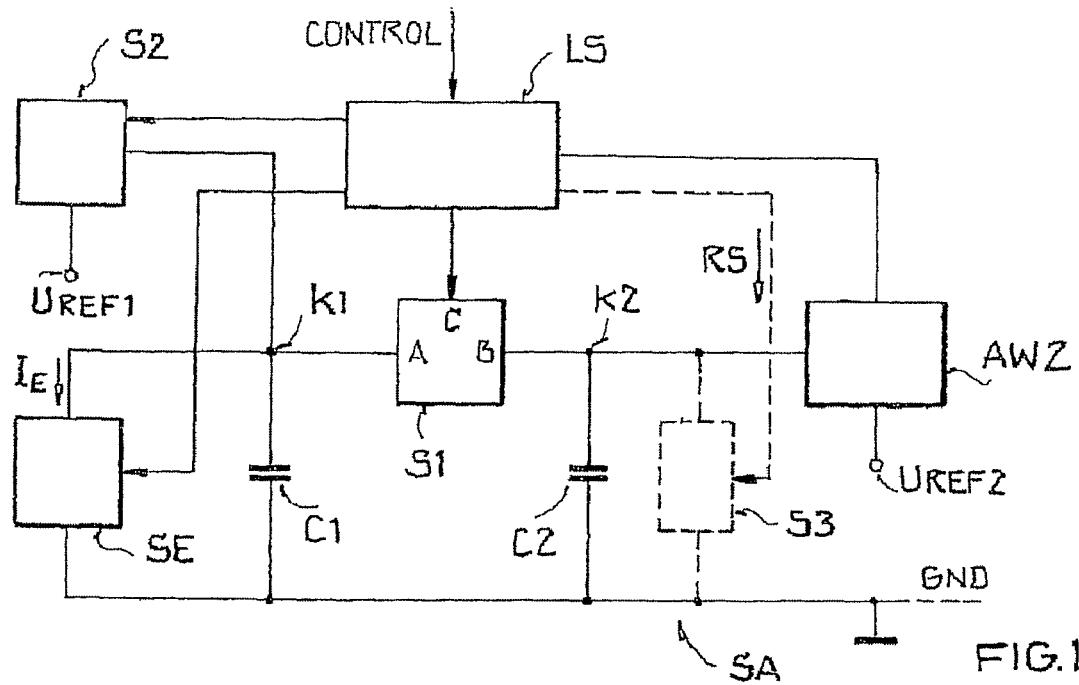
FIG. 1 shows a block diagram of a circuit arrangement of the invention comprising two storage devices and an evaluation circuit.

Using a block diagram, FIG. 1 shows an embodiment of the storage circuit arrangement SA of the invention, as it is used in a passive RFID transponder (not shown as such).

Circuit arrangement SA has two capacitors C1, C2 as storage device for electrical energy, each of which is connected between a node K1 or K2 of the circuit arrangement SA and a common reference potential, here ground GND. Nodes K1, K2 are connected via a first switching device S1 in the form of an NMOS transistor. In this way, separated voltage/signal modes can be produced at nodes K1, K2 by closing of switching device S1 (blocking transistor). The capacity of first capacitor C1 is thereby much greater than the capacity of capacitor C2, i.e., C1>>C2.

A discharge device in the form of a current drain SE is connected between node K1 and the reference potential GND—and thereby separable from node K2 by transistor S1 in a signaling fashion—parallel to capacitors C1, C2; this can be, for example, a suitably designed current mirror circuit with self-blocking MOSFET transistors, across which capacitor C1 can be discharged in a defined fashion. Furthermore, node K1 is connected via a second switching device S2 in the form of another NMOS transistor to a source for a first reference voltage UREF1.

In addition, an evaluation circuit AW2, which may be especially an inverter or comparator, for the storage mode of capacitor C2 is connected at node K2—and thereby separable from node K1 by transistor S1 in a signaling fashion. This is connected, moreover, to a second reference voltage UREF2, which according to the invention is much smaller than the first reference voltage for charging capacitor C1, i.e., UREF1>>UREF2.

When a comparator is used, the second reference voltage UREF2 can be selected virtually freely and is used for the HIGH/LOW evaluation of the storage mode of capacitor C2. In contrast, the reference voltage UREF2 when an inverter is used can be identified with its operating voltage, which in turn is linked to its switching threshold, so that here as well there are certain, nevertheless only limited setting options, which are known to the person skilled in the art.

Optionally (and therefore shown as a broken line), the circuit arrangement SA has a third switching device S3 in the form of another NMOS transistor between node K2 and the reference potential GND in a parallel circuit particularly to capacitor C2. This parallel circuit as well can thereby be separated from node K1 by transistor S1.

To control switching device S1 to S3 and discharge device SE, according to FIG. 1, a logic switching unit LS is provided, which has a functional signaling connection respectively at least to the aforementioned means, which is indicated by drawing the connecting arrows. In addition, a logic switching unit is functionally connected to evaluation circuit AW2 and is formed to receive control signals from additional transponder circuit devices (not shown) (arrow CONTROL in FIG. 1).

The previously explained storage circuit arrangement SA operates as follows: It functions as a status register, which is "set" after detection of the tag by the base station (not shown), i.e., assumes the value one (HIGH), whereupon the transponder is switched to mute for the communication with the base station, until said station again resets the status register to zero via a special command (reset RS (cf. FIG. 1), wake-up, or the like). In addition, according to the aforementioned ISO standard, however, it is also to be possible that the tag automatically resets the respective status bit after a certain time t.

To accomplish this, according to the invention, first the relatively large capacitor C1 in accordance with a suitable control signal CONTROL is charged by the logic switching unit LS to a specific voltage UREF1, in that said unit causes an opening of switching device S2. Next—also upon control prompting by logic circuit unit LS—from a specific time onward a defined discharging of capacitor C1 occurs via discharge device SE by means of a suitably set small discharge current $I_E$ (cf. FIG. 1), over which therefore a (persistence) time t, definable by dimensioning, is achieved, which according to the invention was adapted to the requirements of the aforementioned ISO standard.

The following applies for the discharge time t because $Q=C \cdot U$ and $I=Q/t$:

$$t = \frac{C1 \cdot \Delta U}{I_E}$$

with $\Delta U$=UREF1−UREF2. The setting of the discharge time t occurs preferably by defined minimizing of the discharge current $I_E$, because each increase in the capacitor area to increase C1 is associated with costly chip area losses and an increase of the voltage by pumping is too expensive.

In order to now "enter" in the status register of the invention that the particular transponder was already detected, the voltage from capacitor C1 to capacitor C2 is temporarily stored by opening the first switching device S1, and a voltage dip does not occur because of the relative dimensioning of the capacitors (C1 >>C2). Capacitor C1 can thereby can be loaded either with a present voltage supply of the tag routinely or alternatively in each case only in the case of a necessary mode storage, i.e., selectively. After completed temporary storage in capacitor C2, therefore, the status register has the value one, which can be determined with the evaluation circuit AW2 connected to capacitor C2, particularly by comparison with a reference voltage UREF2 relatively small compared with the charging voltage UREF1. The evaluation occurs in particular at regular time intervals, which are predefined by the employed protocol.

The temporary storage in capacitor C2 occurs advantageously at the earliest possible time to shorten the settle time, to be followed according to the protocol, which depends on the value of the particular capacitance, and therefore to accelerate the anticollision. To this end, before the charging of capacitor C1 its voltage is charged to capacitor C2 (opening of switching device S1). Capacitor C1 is then charged and simultaneously the storage mode of capacitor C2 is evaluated, which takes a certain time. After switching device S1 is closed, capacitor C1 is then discharged in a defined fashion, as described above.

Whereas capacitor C1 is discharged over time t, capacitor C2 holds the control mode (HIGH=detected) of the transponder. For this purpose, the first switching device S1 is formed in such a way that no leakage currents occur if possible, so that the storage level of capacitor C2 corresponds furthermore to the evaluation result HIGH, when time t has elapsed. In the case of the use of an NMOS transistor, described here, to accomplish this preferably the width-length ratio is adjusted so that the occurring leakage currents are minimized (reduced length, relatively large width), which is familiar per se to the person skilled in the art. After elapse of time t, or when the voltage at capacitor C1 has dropped below a certain value, capacitor C2 is then also discharged in accordance with logic circuit LS, according to a specific embodiment of the invention either via discharge device SE by opening of switch S1 or via the optional switching device S3. Therefore, the storage circuit arrangement SA of the invention automatically resets the particular status bit after a defined time, here: the discharge time t, as required in the aforementioned standard.

After a short field gap (duration<t) is overcome, during which an already read transponder (capacitor C2 charged) has no or only a very small supply voltage, so that a reset was triggered, the transponder when it again reaches a zone with sufficient field strength and accordingly a high supply voltage is again basically promptly ready to communicate. However, according to the invention, it does not intervene further in a still running anticollision procedure until the (discharge) time t has totally elapsed. By means of the early temporary storage of the voltage from capacitor C1 to capacitor C2, as discussed heretofore, the former can be recharged very early after reaching a zone with sufficient field strength to enable a maximum persistence time.

A defined resetting of the status register of the invention is possible according to FIG. 1, in that the logic circuit LS transmits a suitable control signal, such as a reset signal RS (FIG. 1) or the like, to the third switching device S3, so that said means opens and discharges capacitor C2. At a later time, optionally voltage from capacitor C1 to capacitor C2 can then again be stored temporarily.

Figure 2:
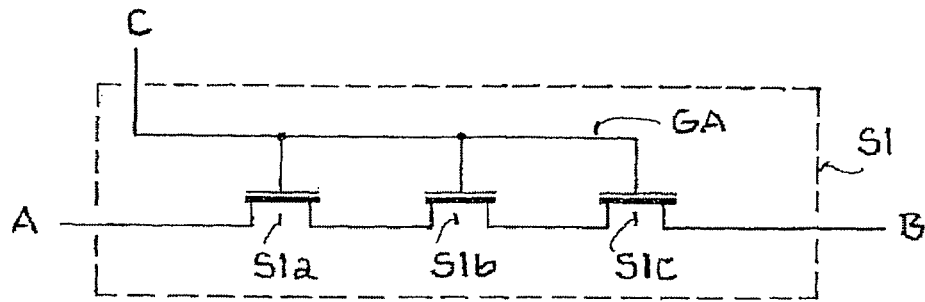
FIG. 2 shows a detail view of the block diagram of FIG. 1 in a first additional embodiment of the circuit arrangement of the invention.
Figure 3:
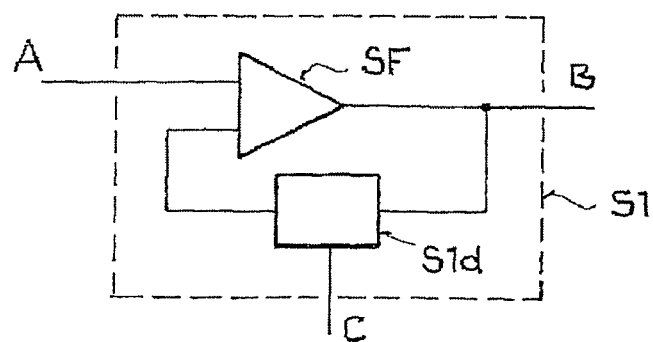
FIG. 3 shows a detail view of the block diagram of FIG. 1 in a second additional embodiment of the circuit arrangement of the invention.

FIGS. 2 and 3 show in each case alternative detail views of a storage circuit arrangement, otherwise corresponding substantially to the drawing in FIG. 1, according to additional embodiments of the invention. For reasons of clarity, in this case certain connecting points according to FIG. 1 were labeled with reference characters A, B, C, to enable simple assignment.

According to FIG. 2, at least one switching device of the storage circuit arrangement SA of the invention (FIG. 1), here especially the first switching device S1, is formed not as a simple transistor but as a series connection of a plurality of NMOS transistors S1a, S1b, S1c, which have a common gate terminal GA. Accordingly, according to the invention, additional switching device S2, S3 can also be formed.

According to FIG. 3, alternatively or in addition at least one switching device of the storage circuit arrangement SA of the invention (FIG. 1), here also the first switching device S1, are formed again not as a simple transistor but as a switching unit with the voltage follower SF, such as a linear noninverting amplifier, and with at least a switch S1d for turning off the voltage follower SF. The switch S1d according to the invention can again be an NMOS transistor. Accordingly, according to the invention, additional switching device S2, S3 can also be formed.

Of course, the NMOS switching device in the shown figures can be replaced in a suitable way by equivalent switching device, such as particularly PMOS switching device or micromechanical switches with a low leakage current, which is familiar to the person skilled in the art.

The previously described embodiments of the invention, in comparison with the prior art, possess in particular the advantage that a defined time t can be set by dimensioning, so that a reliable anticollision procedure can be carried out over broad temperature ranges. During this procedure, particularly after a completed mute switching, the tag can be addressed further at any time by the base station. Nevertheless, an already detected tag after leaving a field gap, whose time duration is less than time t, does not automatically again intervene in the communication, because the prior control mode remains stored. The entire communication is accelerated, in addition, by eliminating or shortening the settle time with the provision of a second, smaller storage device C2, C2<<C1. Finally, as implicitly required according to ISO-IEC_CD 18000-6C, a discharge occurs not only during supply gaps but also when a sufficient supply voltage is steadily present.

Figure 4:
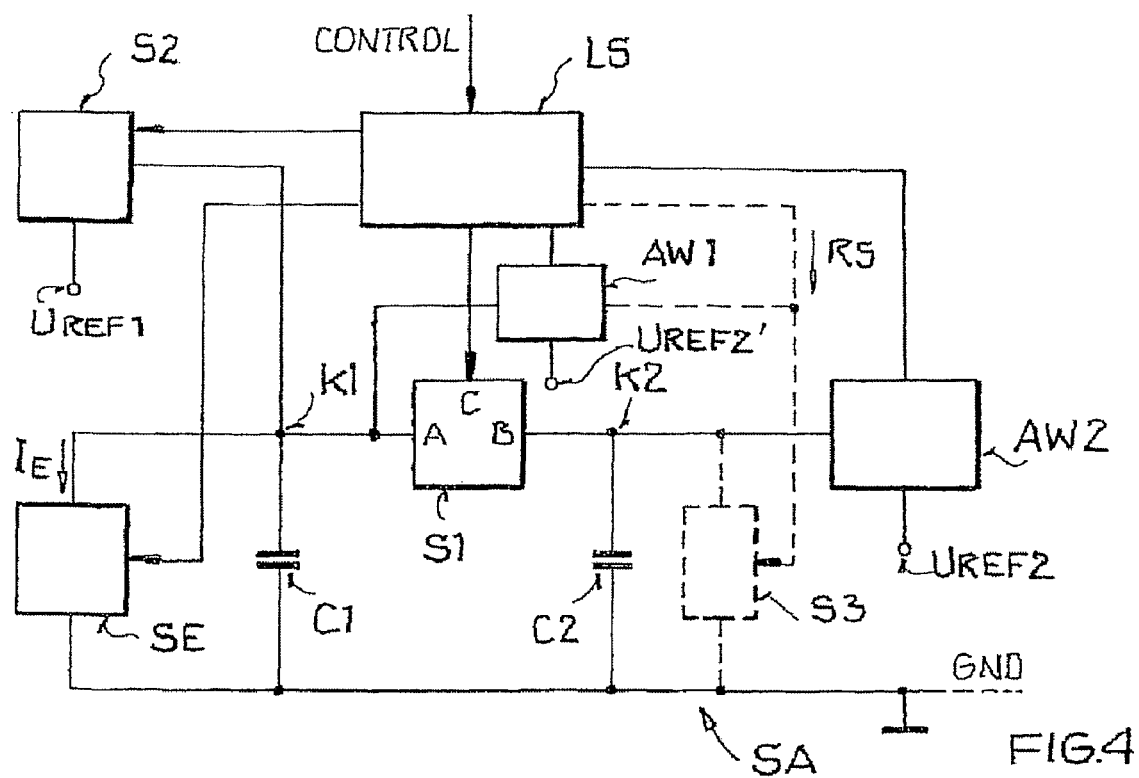
FIG. 4 shows a block diagram of a circuit arrangement of the invention comprising two storage devices and two evaluation circuits.

In conclusion, FIG. 4 shows a variant of the circuit arrangement of the invention according to FIG. 1, in which in addition to evaluation circuit AW2 functionally connected to the second storage device C2, there is another evaluation circuit AW1 for evaluating a storage mode of the first storage device C1. The evaluation circuit AW1 as well is preferably either a comparator or a (CMOS) inverter, which, on the one hand, is linked to the logic circuit unit LS and, on the other, to node K1 and connection point A of the first switching device S1. According to the evaluation circuit AW2 for the second storage device C2, the evaluation circuit AW1 is also connected to a reference voltage UREF2' for evaluating the storage mode of storage device C1, whereby it again applies that UREF2'<<UREF1. In this case, preferably UREF2'=UREF2. Furthermore, evaluation circuit AW1, according to FIG. 4, is formed to provide a control signal, such as a reset signal RS, for the third switching device S3, as is symbolized by a broken line proceeding from evaluation circuit AW1. Thus, it is possible, in accordance with the evaluation result in evaluation circuit AW1 for storage device C1, e.g., in the case of a demonstrated LOW level (logic zero, not selected), to bring about a selective mode change also at second storage device C2, especially a discharge.

Although heretofore only embodiments with two jointly acting storage device C1, C2 were described, the scope of protection of the present invention also extends to storage circuit arrangements, which have only one (first) storage device C1 together with the associated evaluation circuit AW1 and associated charge and discharge device. It is critical that the storage device after the charging during a predefined time t via a defined current can again be discharged, irrespective of whether a supply voltage is present. According to the embodiment and arrangement of the third switching device S3, a reset option (rapid, selective discharge), which can be controlled in particular by the logic circuit unit LS, is then also to be provided for the single storage device C1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage circuit arrangement for a semi-passive or passive RFID transponder, comprising:
    at least one first storage device for storing electrical energy, which is formed to maintain a control mode of the transponder for a predefined time t;
    a discharge device via which the first storage device is discharged within the time t in a defined fashion; and
    a second storage device for storing electrical energy, which is functionally connected to the first storage device via a controllable switching device to transfer a storage mode of the first storage device.

2. The storage circuit arrangement according to claim 1, wherein the first and/or second storage device are capacitors.

3. The storage circuit arrangement according to claim 1, wherein the first storage device at the same voltage takes up more electrical energy than the second storage device.

4. The storage circuit arrangement according to claim 1, further comprising a second controllable switching device, which charges the first storage device with a first reference voltage, is connected between the first reference voltage and the first storage device.

5. The storage circuit arrangement according to claim 1, wherein the second storage device is discharged via a third controllable switching device.

6. The storage circuit arrangement according to claim 1, further comprising a logic circuit with a functional signaling connection to the discharge device and/or the first switching device and/or the second switching device and/or a third switching device for controlling at least one of these means.

7. The storage circuit arrangement according to claim 6, wherein at least one of the first, second, or third switching device is a MOS transistor.

8. The storage circuit arrangement according to claim 1, further comprising an evaluation circuit for a storage mode of the first storage device with a functional connection to the second storage device.

9. The storage circuit arrangement according to claim 6, wherein the evaluation circuit is functionally connected to a second reference voltage.

10. The storage circuit arrangement according to claim 1, further comprising an evaluation circuit for a storage mode of the second storage device with a functional connection to the second storage device.

11. A method for holding a control mode of a semi-passive or passive RFID transponder, the method comprising:
    charging a first electrical storage device to hold a control mode with a first reference voltage;
    discharging the first electrical storage device in a defined fashion during a time t;
    wherein a storage mode of the first electrical storage device to hold the control mode is transmitted in a controlled fashion to a second storage device; and
    wherein the storage mode of the first electrical storage device is transmitted to the second storage device before the first electrical storage device is charged.

12. The method according to claim 11, wherein the first electrical storage device is charged at least when the transponder is supplied with power after a power supply gap.

13. The method according to claim 12, wherein the second storage device is discharged in accordance with a corresponding control signal.

* * * * *